United States Patent [19]

Hatta

[11] Patent Number: 4,618,927
[45] Date of Patent: Oct. 21, 1986

[54] ELECTRONIC GAME APPARATUS

[75] Inventor: Koichi Hatta, Yamatokoriyama, Japan

[73] Assignee: Sharp Kabushiki Kaisha, Osaka, Japan

[21] Appl. No.: 497,427

[22] Filed: May 24, 1983

[30] Foreign Application Priority Data

May 24, 1982 [JP] Japan .................................. 57-89380
Jun. 28, 1982 [JP] Japan ................................. 57-112180

[51] Int. Cl.⁴ .......................... G06F 15/44; A63F 9/00
[52] U.S. Cl. .................................... 364/410; 364/411; 364/705; 273/85 G; 273/DIG. 28
[58] Field of Search .................. 364/400, 410–412, 364/700, 705, 709–710; 273/1 E, 1 ES, 86 B, 313, 237, DIG. 28, 85 G

[56] References Cited

U.S. PATENT DOCUMENTS

| 4,053,740 | 10/1977 | Rosenthal ...................... 364/410 X |
| 4,231,090 | 10/1980 | Fatton ................................. 364/411 |
| 4,296,930 | 10/1981 | Frederiksen ................... 364/410 X |
| 4,339,134 | 7/1982 | Macheel ......................... 364/412 X |
| 4,352,492 | 10/1982 | Smith ....................... 273/DIG. 28 X |
| 4,398,086 | 8/1983 | Smith, III ....................... 364/410 X |
| 4,455,024 | 6/1984 | Yanagawa .............. 273/DIG. 28 X |

FOREIGN PATENT DOCUMENTS 8101895 7/1981 PCT Int'l Appl. ................ 364/410

Primary Examiner—Gary V. Harkcom
Attorney, Agent, or Firm—Birch, Stewart, Kolasch & Birch

[57] ABSTRACT

An electronic game apparatus is included within an electronic calculator or the like and includes a display, game key elements of a shift key and a shot key, and a CPU. The display utilized is the display of an electronic calculator and shows one or more target symbols such as digits, and its corresponding game indicia. The CPU is operated to shift the figure position of the one or more target symbols and the game indicia. The CPU is responsive to the actuation of the shift key for shifting the figure position of the one or more target symbols and the game indicia, so as for the game indicia to follow the figure position of the one or more target symbols. The CPU is further responsive to the actuation of the shot key for shooting the one or more target symbols with the game indicia to thereby erase the display of the one or more target symbols.

9 Claims, 45 Drawing Figures

FIG.7

| DIFFICULTY CLASS | DISPLAY TARGET NUMBER | REGION OF CHANGING TARGET | SPEED CLASS | ERROR NUMBER ALLOWANCE | TARGET NUMBER TO BE HIT | SHOT NUMBER |
|---|---|---|---|---|---|---|
| 1 | 2 | 0→9 | A | 3 | 40 | 60 |
| 2 | 2 | ″ | B | 3 | 40 | 60 |
| 3 | 3 | ″ | B | 3 | 40 | 60 |
| 4 | 3 | ″ | C | 3 | 40 | 60 |
| 5 | 4 | ″ | C | 3 | 40 | 60 |
| 6 | 4 | ″ | D | 4 | 60 | 80 |
| 7 | 4 | 3→9 | D | 4 | 60 | 80 |
| 8 | 4 | 4→9 | D | 4 | 60 | 80 |
| 9 | 4 | 5→9 | E | 4 | 60 | 80 |

| F | F | 3 | F | F | 6 | F | F | X
| 0 | 0 | 1 | 0 | 0 | 1 | 0 | 0 | Y
FIG.10
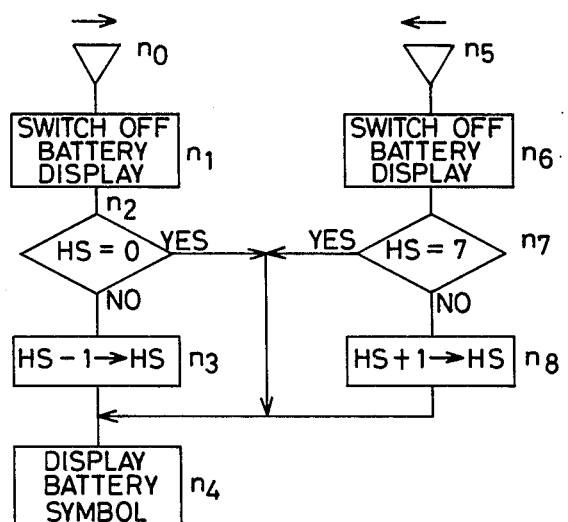
FIG.11
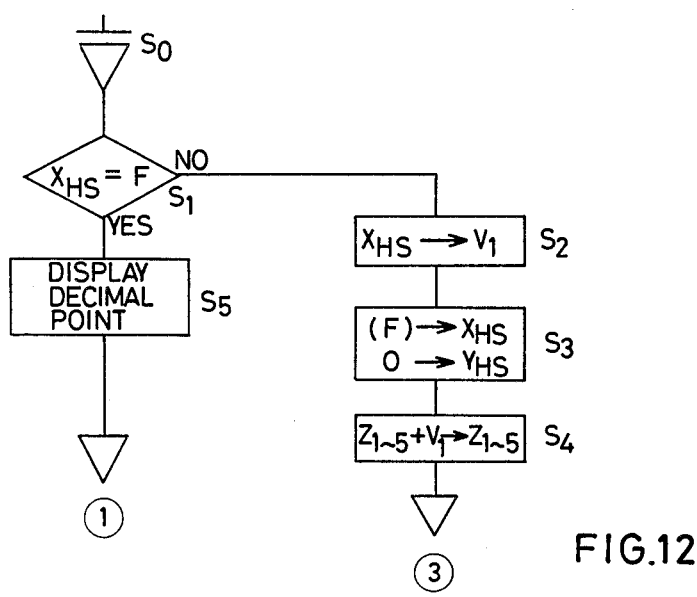
FIG.12

| DIFFICULTY CLASS | DISPLAY TARGET NUMBER | REGION OF CHANGING TARGETS | SPEED CLASS | ERROR NUMBER ALLOWANCE | TARGET NUMBER TO BE HIT | SHOT NUMBER |
|---|---|---|---|---|---|---|
| 1 | 2 | 0 → 9 | ABOUT 760M SEC | 3 | 40 | 60 |
| 2 | 2 | 0 → 9 | 600M SEC | 3 | 40 | 60 |
| 3 | 3 | 0 → 9 | 600M SEC | 3 | 40 | 60 |
| 4 | 3 | 0 → 9 | 550M SEC | 3 | 40 | 60 |
| 5 | 4 | 0 → 9 | 550M SEC | 3 | 40 | 60 |
| 6 | 4 | 0 → 9 | 500M SEC | 4 | 60 | 80 |
| 7 | 4 | 3 → 9 | 500M SEC | 4 | 60 | 80 |
| 8 | 4 | 4 → 9<br>B → E | 500M SEC | 4 | 60 | 80 |
| 9 | 4 | 5 → 9<br>B → E | 450M SEC | 4 | 60 | 80 |

FIG.18

| TARGET CODE | A (1010) | B (1011) | C (1100) | D (1101) | E (1110) |
|---|---|---|---|---|---|
| DISPLAY PATTERN | ¯│ │ | ─ | │_ | ⌐ | □ |

ELECTRONIC GAME APPARATUS

BACKGROUND OF THE INVENTION

The present invention relates to an electronic game apparatus and, more particularly, to an electronic game calculator or timepiece.

As conventional electronic calculators, timepieces, or the like comprise displays for displaying a plurality of digits, it may be possible to use the displayed digits as parts of an electronic game machine. In this respect, several game devices have been proposed in an attempt to incorporate these devices into the calculators, timepieces or the like.

Therefore, it is desired to provide an improved electronic game apparatus to expand the possible uses of an electronic calculator or the like.

SUMMARY OF THE INVENTION

Accordingly, it is an object of the present invention to provide an improved electronic game apparatus using the display digits of an electronic calculator or the like as part of an electronic game.

It is another object of the present invention to provide an improved electronic game apparatus additionally providing game display indicia in a display of the apparatus.

It is a further object of the present invention to provide an improved electronic game apparatus for additionally providing a game key in a keyboard of the apparatus for operating a game operation of this apparatus.

Briefly described, in accordance with the present invention, an electronic game apparatus comprises a display for displaying digits, and corresponding game indicia such as batteries. A keyboard of the apparatus comprises a game key in addition to conventional key switches for operating the apparatus in its intended conventional use. A CPU of the apparatus is provided for controlling a game featured where a score is developed when the figure position of one of the digits is identical with the figure position of one of the game indicia. The digits are shifted at random. The game indicia are shifted by operating the game key.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 7 and 18 show tables for representing game parameters selected for one of the games accrding to the present invention;

FIG. 10 shows the contents of a register means connected in the circuit of FIG. 8; and FIGS. 11 to 14, and 20(A) to 20(G) show flow charts representative of the operation of the games according to the present invention.

DESCRIPTION OF THE INVENTION

Figure 1:
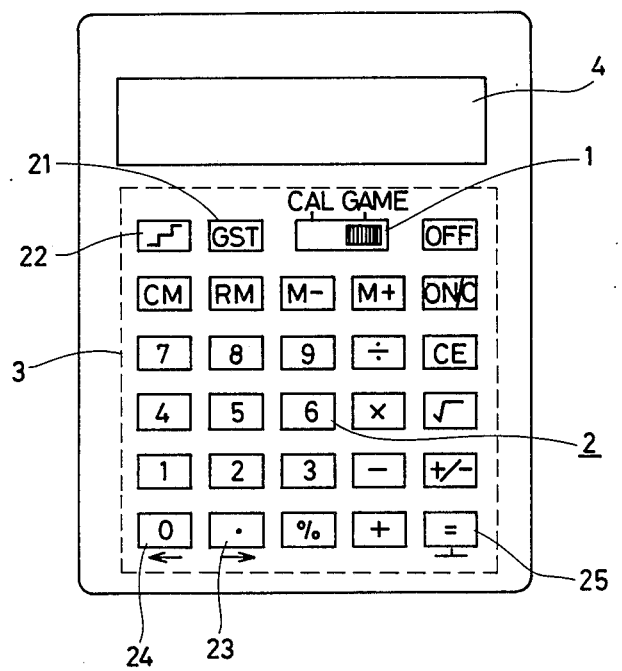
FIG. 1 shows a plan view of an electronic game apparatus according to the present invention.

FIG. 1 shows an electronic game apparatus according to the present invention. Although the apparatus of FIG. 1 is an electronic calculator, the electronic apparatus of the present invention may not be limited to such a device. The apparatus may be an electronic timepiece.

The electronic game calculator of FIG. 1 comprises a mode switch 1, key switches 2, a keyboard 3, and a liquid crystal display (LCD) 4.

The mode switch 1 is actuated to select either an electronic calculator mode or an electronic game mode. The key switches 2 are actuated to operate in both the electronic calculator mode and the electronic game mode. In the keyboard 3, a game start key 21, a difficulty class selection key 22, battery shift keys 23 and 24, and a shot key 25 are provided for the electronic game mode.

The game start key 21 is operated to start the electronic game mode. The difficulty class selection key 22 is actuated to select one difficulty class from those of the games among "1" to "9" difficulty classes. Each time the class selection key 22 is actuated once, a more difficult class can be selected.

The battery shift keys 23 and 24 are actuated to shift the figure positions of the batteries toward the figure positions of the digits. Each time the battery shift key 23 is operated once, the figure position of the battery indicia during displaying is shifted right one figure. The battery shift key 24 is operated to left shift the figure position of the battery indicia. Each time the battery shift key 24 is actuated once, the figure position of the battery indicia during displaying is shifted left one figure. The shot key 25 is actuated to take a shot at one of the digits to erase the digit, if the figure position of one of the digits is identical with that of one of the battery indicia.

These game key switches 21 to 25 can be operated as conventional calculator keys in the electronic calculator mode.

Figure 2:
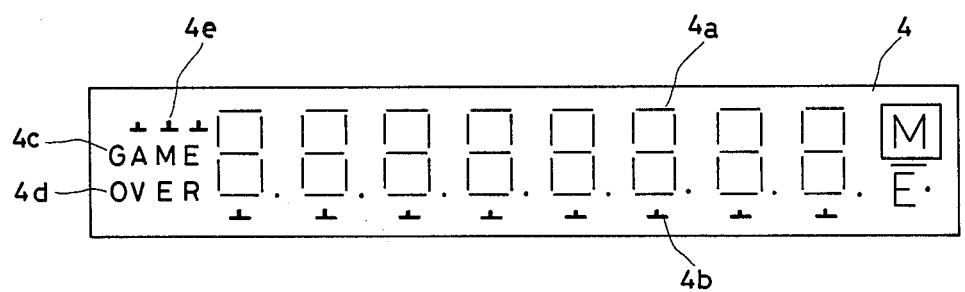
FIG. 2 shows a display equipped within the apparatus of FIG. 1.

FIG. 2 shows the display 4 for displaying a plurality of digits including a decimal point 4a, a plurality of battery indicia 4b, a game period indicia "GAME" 4c, a game period over "GAME OVER" indicia 4d, and segments 4e illuminated for representing the number of the remaining battery indicia.

FIGS. 3 to 6 show game conditions according to the present invention.

Figure 3:
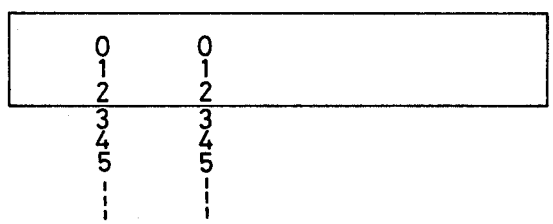
FIGS. 3, 4A-4D, 5, 6A-6E, 15A-15F, 16A, 16B and 17A-17G show display conditions for illustrating the operation of a game with the apparatus of the present invention.

With reference to FIG. 3, the digits can be displayed at the random 8-figure positions. Each of digits can be changed from 0 to 9 with a rapid speed. To stop the advancement of the digits, the shot key 25 is actuated to take a shot at at least one of the digits after the figure position of battery indicia is transported toward the figure position of said at least one of the digits by actuating the battery shift keys 23 and 24. A score is improved corresponding to the number of the said one of the digits which has been hit.

The game start key 21 is actuated to start the game. As FIG. 3 shows, the random digits are displayed on the 8 figures, sequentially, according to a selected speed of changing the digits depending on a difficulty class.

Figure 4A:
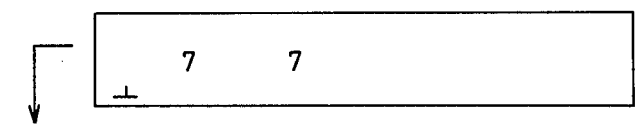
Figure 4B:
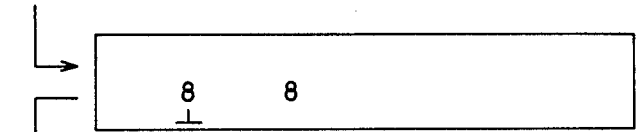

FIGS. 4(A) and 4(B): During changing the digits from 0 to 9, the battery indicia are transported toward the digit figure by actuating the shift keys 23 and 24. The shot key 25 is actuated to take a shot at this digit to thereby erase this digit.

Figure 4C:
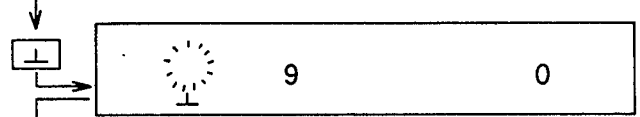

FIG. 4(C): Once a digit is erased, another digit appears at another random figure position. Thus, two digits appears at the same time, continuously.

Figure 4D:
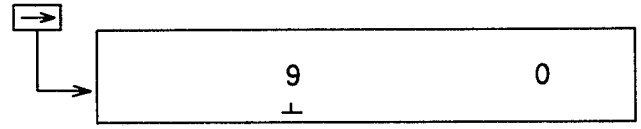

FIG. 4(D): The figure of the battery indicia is moved by two figures by actuating the shift key 23, so that the battery figure is made identical with the digit figure.

A score is obtained by multiplying the digit data by 10, when the digit is shot and erased. A game is finished when a preset number of the digits is attained, so that a next game pattern is selected. The number of the stored game patterns is 9.

Once the changing digits exceed 9 for three times in the same game pattern, the game is over. Otherwise, once some number of the changing digits exceeding a preset number in the same game pattern has been hit, the game is over.

1. shooting digits:

Once the figure position of at least one of the changing digits is made identical with that of the battery indicia and the shot key 25 is actuated at this time, a shot is counted. After a previous score is erased, a new score is set by adding the previous score and a product of the erased digit and 10.

2. a mis-shot at at least one digit:

(1) Although the figure position of at least one of the digits is made identical with that of the battery indicia, an appropriate timing for actuating the shot key 25 is missing, so that the digit cannot be shot or erased. Therefore, the changing digit exceeds 9, eventually.

(2) As the figure position of the changing digit is different from that of the battery indicia, the changing digit exceeds 9.

Figure 5:
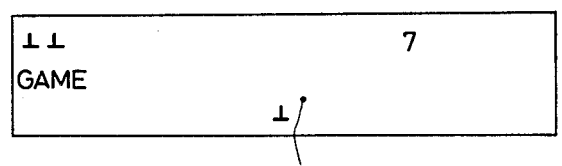

(3) The shot key 25 is actuated when the figure position of the battery indicia is different from that of the changing digit as shown in FIG. 5.

As FIG. 5 shows, a decimal point A is displayed for about 1 second to indicate that the shot key 25 is actuated when the figure position of the battery indicia is different from that of the changing digit.

As FIGS. 6(A) to 6(D) show, in case of the missing operations of 2-(1) and -(2), the game is interrupted in which the decimal point is transferred from the right end to the left end for about 1.5 seconds and the remaining batteries are flickered.

Figure 6A:
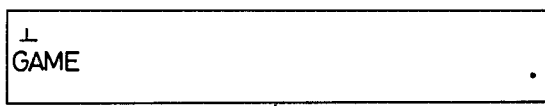
Figure 6B:
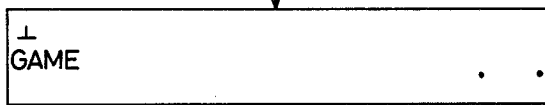
Figure 6C:
Figure 6D:
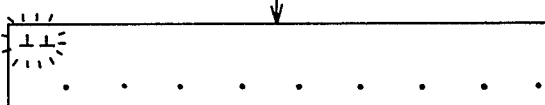
Figure 6E:
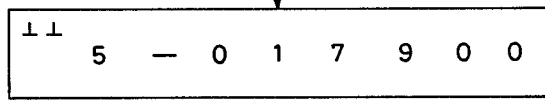

As FIG. 6(E) shows, after the displays of FIGS. 6(A) to 6(D), a present diffuculty class, say, "5" and a present score, say, "017900" are displayed.

FIG. 7 shows a table representative of the game parameters used for the games according to the present invention.

The difficulty classes are divided to 9 classes depending on the changing speed of the digits. In the respective classes, the speed of changing each one of the digits is as follows:

A class: about 760 m seconds
B class: about 600 m seconds
C class: about 550 m seconds
D class: about 500 m seconds
E class: about 450 m seconds For example, the difficulty class 3 is selected, so that the following conditions are elected:

The number of the digits to be displayed is 3. Everyone of the 3 digits is changed from 0 to 9, at a speed of about 600 m seconds (B class). A game is ended when the missing shots are repeated 3 times in the same game pattern. A game is also finished when 40 digits have been shot in the same game pattern. In this class, the total number of the shots to be shot from the battery indicia is set as 60.

Figures 8, 9:
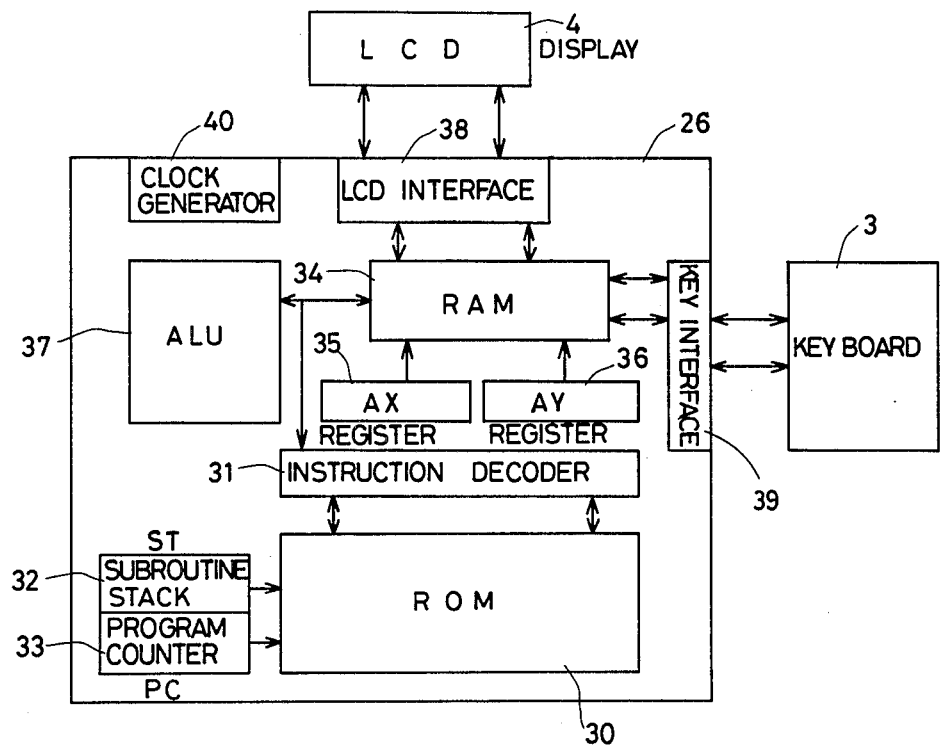
FIG. 8 shows a block diagram of a circuit implemented within the apparatus of FIG. 1.
FIG. 9 shows the memory contents of a RAM connected in the circuit of FIG. 8.

FIG. 8 shows a circuit equipped within the game calculator of FIG. 1.

The circuit of FIG. 8 comprises the keyboard 3, an LSI 26, and the display 4.

The LSI 26 comprises a ROM 30, an instruction decoder 31, a subroutine stack (ST) 32, and a program counter (PC) 33 which operates as a controller. The memory sections of the LSI 26 are a RAM 34, an AX register 35, and an AY register 36. The AX register 35 is operated as a data pointer for selecting a file of the RAM 35. The AY register 36 is operated as the other data pointer for selecting a figure of the RAM 35.

The operation unit of the LSI 26 is an arithmetic and logical circuit (ALU) 37. A liquid crystal display (LCD) interface 38 is provided for interfacing with the liquid crystal display (LCD) 4. A key interface 39 is provided for interfacing with the keyboard 3. A clock generator 40 is provided as a power source clock circuit.

THE STRUCTURE OF THE ROM 30

The ROM 30 stores programs for executing the games of the present invention. The ROM 30 provides various instructions through the instruction decoder 31. The ST 32 stores several subroutines used during executing the programs. The PC 33 is provided as a counter for addressing the programs.

THE STRUCTURE OF THE RAM 34

FIG. 9 shows the construction of the RAM 34. The RAM 34 comprises seven registers X, Y, Z, V, W, B, and F for storing data, and serving as pointers. The address of the seven registers are selected by operating the AX register 35 for selecting a file and the AY register 36 for selecting a figure.

The ALU 37 executes the four rules of arithmetic operations according to the program of the ROM 30. The X register comprising X0 to X7 register locations is provided for storing digits when the digits are changing and advancing. The X0 to X7 locations store the digits. The Y register is provided for storing a "1" signal in some of register locations Y0 to Y7 corresponding to the register locations X0 to X7 each containing a digit, and for storing a "0" signal in the remaining register locations. The Z register is provided for storing a score. The V register is provided for storing additional information forwarded from an XHS register location, so that the contents of the Z register are added with the contents of the V register. The XHS register location selected among the locations X0 to X7 stores digit information corresponding to the battery indicia information in an HS register.

The HS register is provided for storing figure position information of the battery indicia. A W register comprising T0 to T4 is provided as a timer register. A PAT register is provided for storing the selected number among the diffuculty classes. A PATC register is provided for counting up the digits, so that the digits can be advanced at random.

FIG. 10 shows a relation between the X register and the Y register. The X register stores digit information corresponding to the current displayed digits. As stated above, the digits are selected from 0 to 9, and displayed in the LCD 4. When a figure is blank, the corresponding X register location stores an F code. As stated above, the Y register stores "1" signals in the locations corresponding to the X register location containing a digit, and "0" signals in the remaining locations.

FIGS. 11 to 14 show flow charts of the operation of the games according to the present invention.

During the game period, a single battery indicia is displayed in the LCD 4 under the digit column. This display can be executed according to the conventional technique similar to the technique for displaying the decimal point for the calculator mode. As stated above, the battery indicia can be shifted with operating the shift key 23 or 24. A preset number of the digits appears at some of the X register locations. The battery indicia can be shifted to cover the figure position of the digits. For this porpose, the HS register is operated for storing the figure position of the battery indicia. When the battery indicia is positioned at the first figure, the HS stores a "0" signal. When it is positioned at a "5" figure, the HS register stores a "4" signal.

With reference to the flow chart of FIG. 11, the following operations are conducted:

Step n0: The shift key 23 is actuated.

Step n1: The current battery indicia is erased.

Step n2: It is determined whether the HS register stores a "0" signal.

Step n4: When the HS register stores a "0" signal, meaning that the battery indicia is positioned at the lowermost figure, the battery indicia is displayed at this figure from the beginning.

Step n3: When the HS does not store a "0" signal, "HS-1" replaces the previous contents of the HS register, so that the battery indicia is shifted at one right figure.

Figure 13:
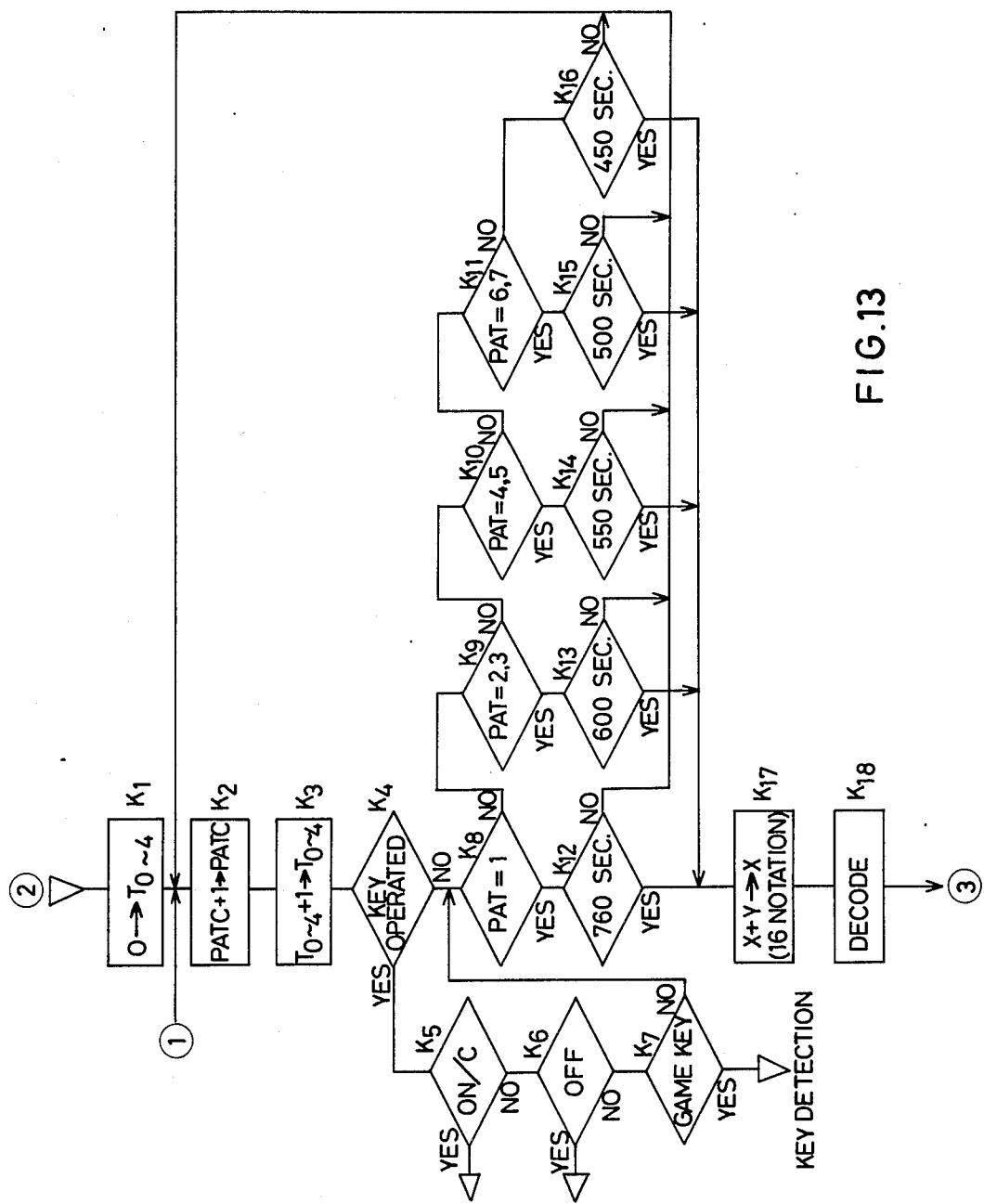

Step n4: The battery indicia is displayed at the shifted figure location. After the battery indicia is displayed, a score count up routine beginning at point 1 . of FIG. 13 is selected.

Step n5: The left shift key 24 is actuated.

Step n6: The currently displayed battery indicia is erased.

Step n7: It is determined whether the HS register stores a "7" signal, meaning that the battery indicia is positioned at the uppermost figure.

Step n4: This step is selected, so that the battery indicia is displayed at the uppermost figure from the beginning.

Step n8: When it is detected at step n7 that HS=7, "HS+1" replaces the previous contents of the HS register, so that the battery indicia is shifted left one figure.

Step n4: The battery indicia is displayed at the shifted figure. The score count up routine ① of FIG. 13 is selected.

FIG. 12 shows a routine for a shot operation. The shot key 25 is actuated to shoot the digit. As stated above, the X register stores blank signals "F" at the locations other than those corresponding to the digits.

Step S0: The shot key 25 is actuated.

Step S1: It is determined whether the XHS register location corresponding to the figure position of the battery indicia stores the "F" code. XHS=F indicates that a mis-shot was executed. If XHS≠F, the shot was successful.

Step S2: After a successful shot, the contents of the XHS are sent into the V1 register.

Steps S3 and S4: The contents of the Z1 to Z5 register locations for storing a score are added with those of the V1 register. A new point is a product of 10 and the shot digit data. This new point is added with the sum of the Z0 to Z5, so that a new score is given.

Step S5: If the shot key 25 is actuated when XHS=F, namely, at a fugure for not containing any changing digit, the decimal point is displayed at the corresponding figure to show this situation.

FIG. 13 shows a display count up routine. The basic operation of FIG. 13 is executed the same as the count up operation of a timer. Once a preset time is reached, a count up of the display is held by replacing "X" with "X+Y" in the 16 notation. The contents of the X register are decoded, so that the displaying is subsequently changed.

With reference to FIG. 13, the following operations are conducted:

Step K1: The timer register T0 to T4 are made clear.

Step K2: The contents of the counter PATC are counted up, so that the digits appear at the random figure positions.

Step K3: The timer T is counted up.

Step K4: It is determined whether key input data are present.

Steps K5 to K7: If some key input data are present, the inputs from the shot key 25 and the shift keys are read in, and, instead, no data from the remaining keys are inputted. If the remaining keys are actuated, the initial routine in which no key is actuated is reselected.

Step K4: When no key is inputted, a count up time is detected depending on a difficulty class selected.

Steps K3 to K11: The selected difficulty class is detected in these steps. According to the contents of the PAT register, a period for changing the digit targets is detected.

Steps K12 to K16: A speed to be changed in the difficulty class is detected.

Step K17: Once a digit-changing period has elapsed, the digit is changing by replacing "X" with "X+Y" in the 16 notation.

Step K18: The contents of the X register are decoded to display the digit.

In this manner, the digits are subsequently changed and displayed.

Figure 14:
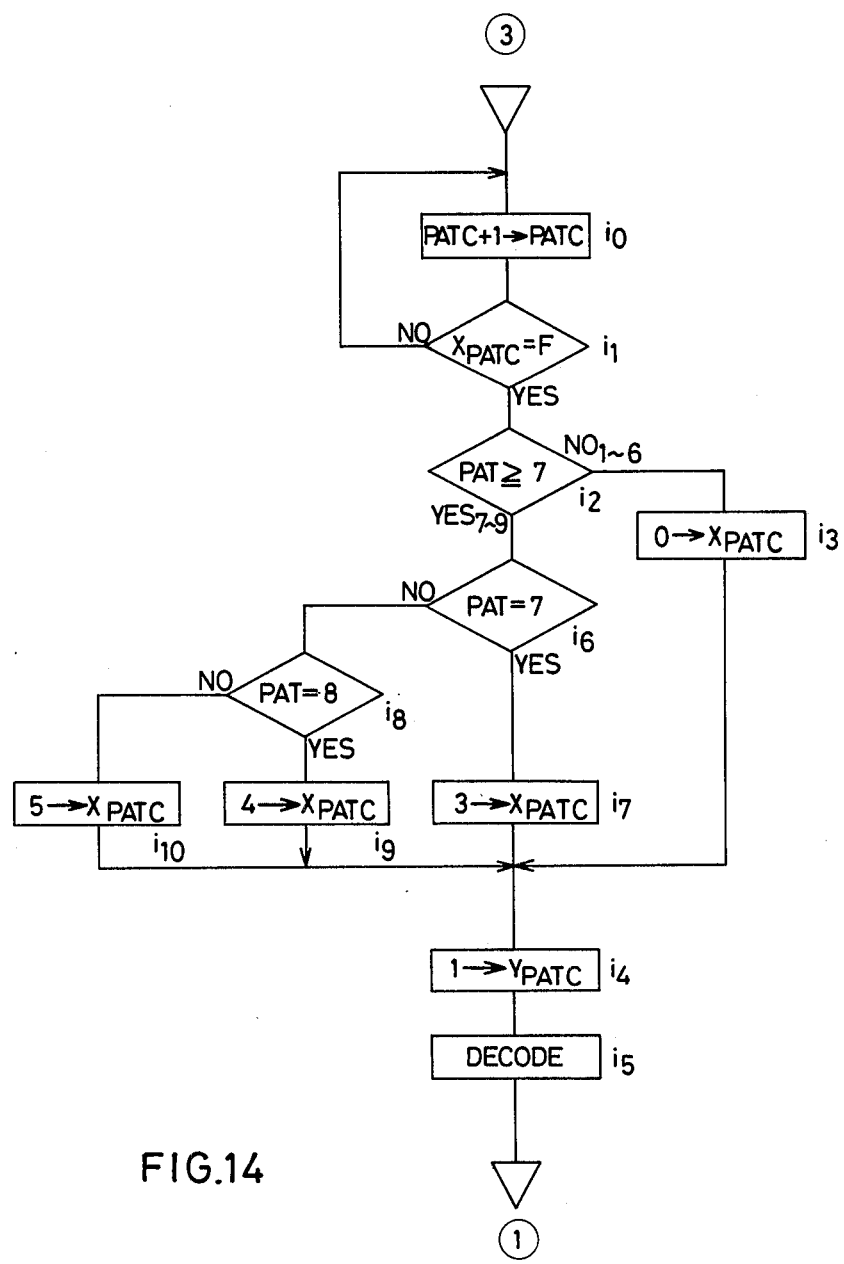
Figure 15A:
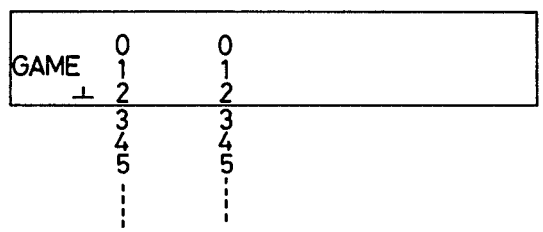
Figure 15B:
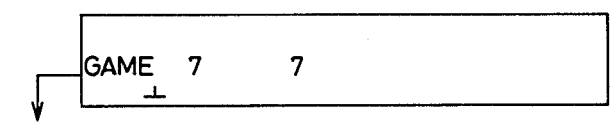
Figure 15C:
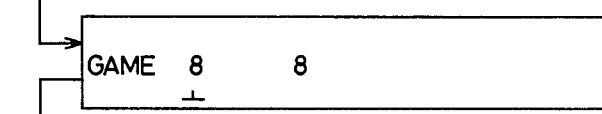
Figure 15D:
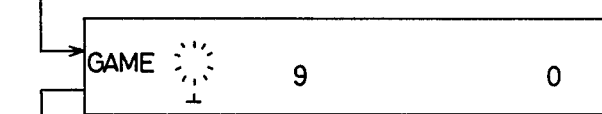
Figure 15E:
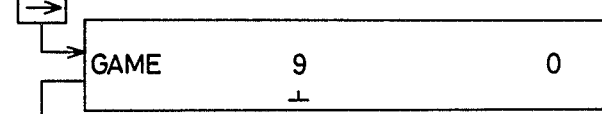
Figure 15F:
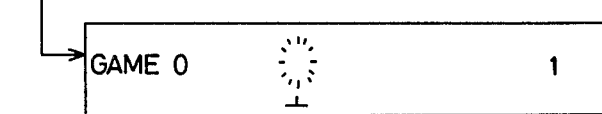
Figure 16A:
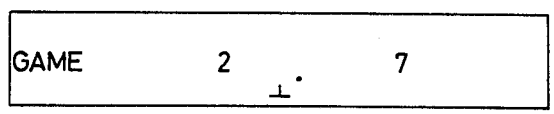
Figure 16B:
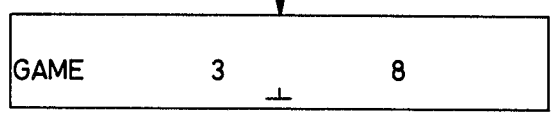
Figure 17A:
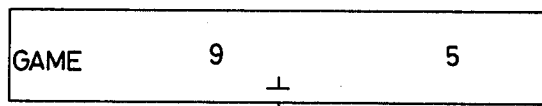
Figure 17B:
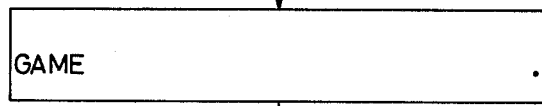
Figure 17C:
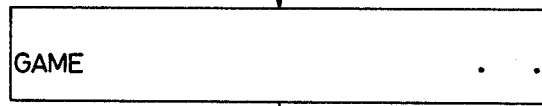
Figure 17D:
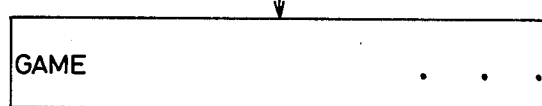
Figure 17E:
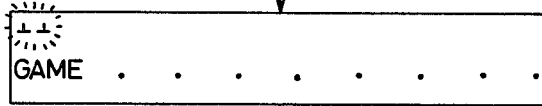
Figure 17F:
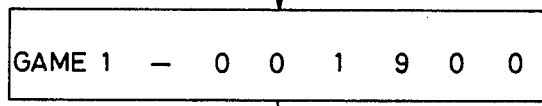
Figure 17G:
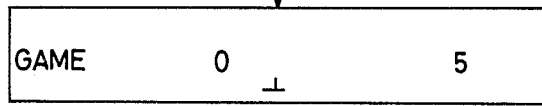

FIG. 14 shows a flow chart for displaying the digits depending on the difficulty class selected. In the flow chart of FIG. 14, after a single digit target has been shot, an 8-notation counting up is continuously held in the LCD 4.

Step i0: The contents of the counter PATC are counted up.

Step i1: It is detected whether an XPATC register corresponding to "0" to "7" signals in the counter PATC stores the blank code "F". When XPATC≠F, it is meant that this figure has a digit. Therefore, the PATC register is counted up until XPATC=F. XPATC=F indicates that this figure has no digit, in which case a next detection is conducted to allow a digit complying with a difficulty class to appear.

Step i2: It is detected whether the register PATC for storing the difficulty class stores a figure smaller than 7.

Step i3: When the number of the difficulty class is smaller than 7, a "0" signal is inputted into the register XPATC.

Step i4: A "1" signal is inputted into the register YPATC.

Step i5: The contents of the register locations X0 to X7 are decoded for displaying them in the LCD 4.

Step i6: When the PAT register stores a figure equal to or more than 7, this step is executed to detect whether the contents of the reigster PAT equal 7.

Step i7: When PAT=7, namely, the difficulty class is the seventh, a "3" signal is inputted into the register XPATC.

Step i8: When XPATC=7, it is detected whether PAT=8.

Step i9: When PAT=8, a "4" signal is entered into the location XPATC.

Step i10: When PAT=8, a "5" signal is entered into the location XPATC.

It is determined whether the difficulty class is of 7 to 9. The number of the difficulty class is transferred into the location XPATC. A "1" signal is entered into the location YPATC. The contents of the location YPATC are decoded and displayed in the LCD 4.

Attention is directed to another preferred embodiment of the present invention.

As FIGS. 15(A) to 15(F) are similar to FIGS. 3, 4(A) to 4(D), and 5, any further description is omitted.

According to this preferred embodiment of the present invention, the difficulty class may be or not be selected. If some difficulty class is selected, the selected game is made finished when a present number of digit targets have been shot. If no difficulty class is selected, a first difficulty class is automatically selected and executed. When a preset number of digit targets have been shot in the first class game, in which a score in the first game is displayed, a second class game is selected and executed.

FIGS. 16(A) and 16(B), and 17(A) to 17(G) show examples of a mis-shot at the digit target. As the operations of FIGS. 16(A) and 16(B), and 17(A) to 17(G) are similar to these of FIGS. 5, and 6(A) to 6(E), any further description is omitted.

FIG. 18 shows a table representative of the game parameters for the games. The table of FIG. 18 is similar to that of FIG. 7 except the columns of difficulty classes 8 and 9.

In difficulty class 8, the type of changing the digit targets are "4" to "9", or "B" to "E" which are selective. FIG. 19 shows a display example in the case of "B" to "E". In difficulty class 9, similar changing of the digit targets is executed.

FIGS. 20(A) to 20(G) show flow charts of the operation of games according to this preferred embodiment of the present invention.

As stated above in connection with FIG. 9, the X register comprising the X0 to X7 locations store information representative of currently displaying digits. The codes A to E represent the symbols shown in FIG. 19. The code F represents the blank code as similar to the case of FIG. 10. As similar to the case of FIG. 9, the Y register comprising the Y0 to Y7 locations stores information for counting up the digits to be targeted. The Z register comprising the Z0 to Z5 locations stores information representative of a score.

Further, the PAT register stores information representative of the number of the difficulty class selected. The HS register stores information of the figure position of the battery indicia. The W register comprising the timers T0 to T4 functions as the timer counter. The PATC register of a 8-bit counter functions as the counter for counting up the digits to display the new digits at the random figures. The V register comprising the V1 location stores a code of the digit target.

Specifically, in FIGS. 20(A) to 20(G), a DN counter stores information representative of the number of the digit targets which have been shot. A DC counter stores information representative of the number of remaining shots. A HC counter stores information representative of the number of the remaining battery indicia. A K register comprising K1 and K2 locations stores information representative of the number of the digit targets which have to be shot. A flag FGM indicates that no selection of the difficulty classes is carried out.

The above described registers, the counters, and the flag are formed in the RAM 34 in the circuit of FIG. 8.

The codes A to F represent the following bits:

A: 1010
B: 1011
C: 1100
D: 1101
E: 1110
F: 1111

Figure 20A:
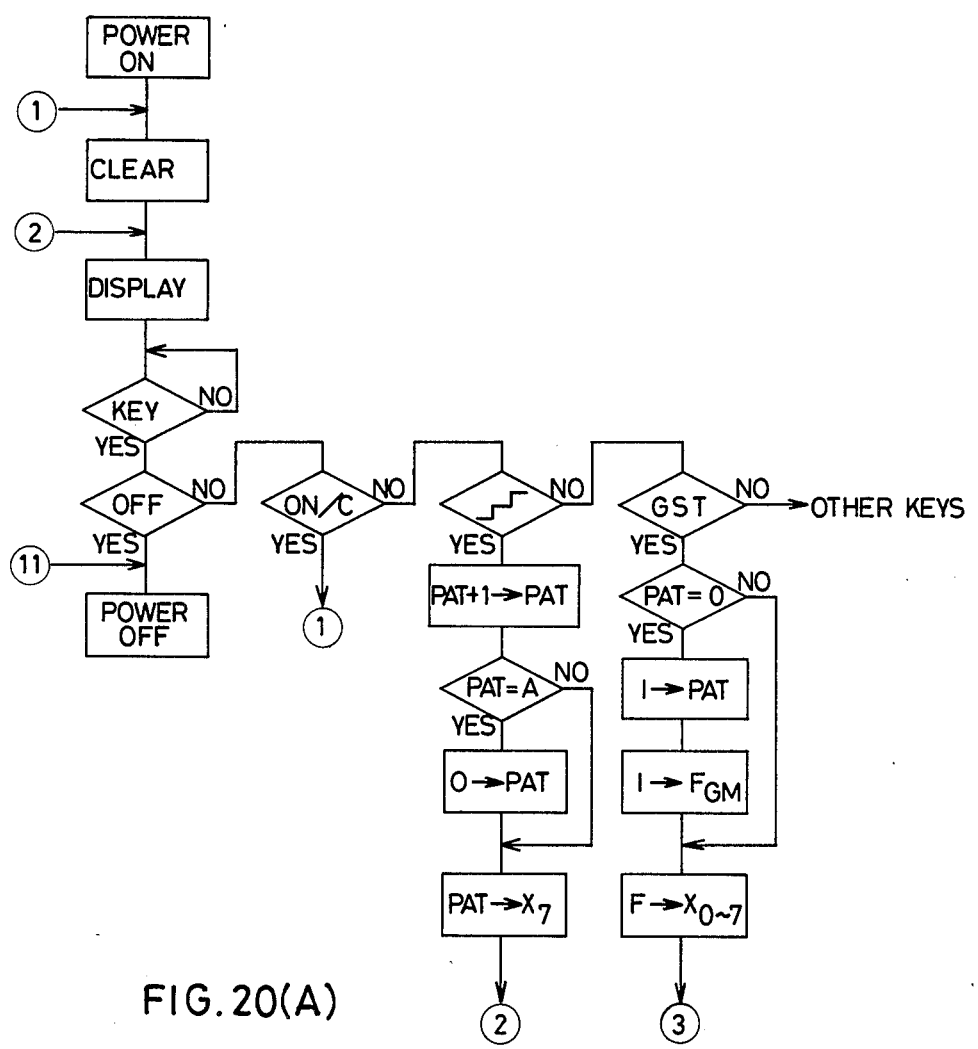

In the flow chart of FIG. 20(A), the following operation is conducted:

Each time the difficulty class selection key 22 is actuated, the PAT counter is counted up by one. When the PAT counter stores the zero information, no difficulty class is selected. The contents of the PAT counter are displayed at the uppermost digit of the LCD 4.

The game start key 21 is actuated to start a game. When PAT=0, meaning that no difficulty class is selected, a "1" signal is entered into the PAT register and the FGM is set. By entering the "F" code in the X0 to X7 locations, all the figures of the X register are made blank.

Figure 20B:
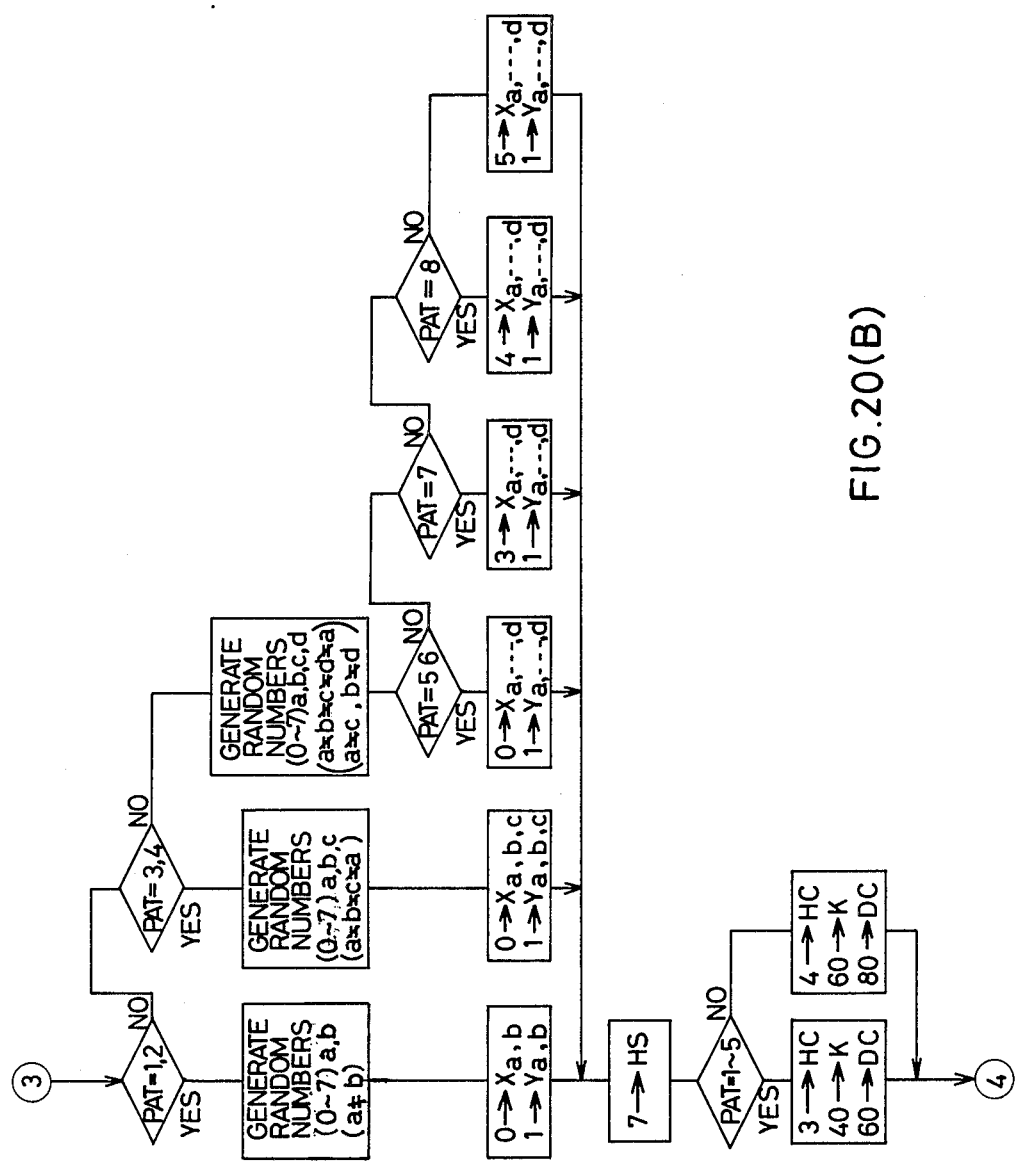

With reference to FIG. 20(B), depending upon the contents of the PAT register, the number and the size of the digit targets are selected. Information for counting up the digit targets is set. At the initial state of the game, the Y register stores the "0" signals in all the figures. The figure position of the battery indicia, the number of the battery indicia, the number of the digit targets to be shot, and the total number of the shots are all selected, corresponding to the contents of the PAT register.

Figure 20C:
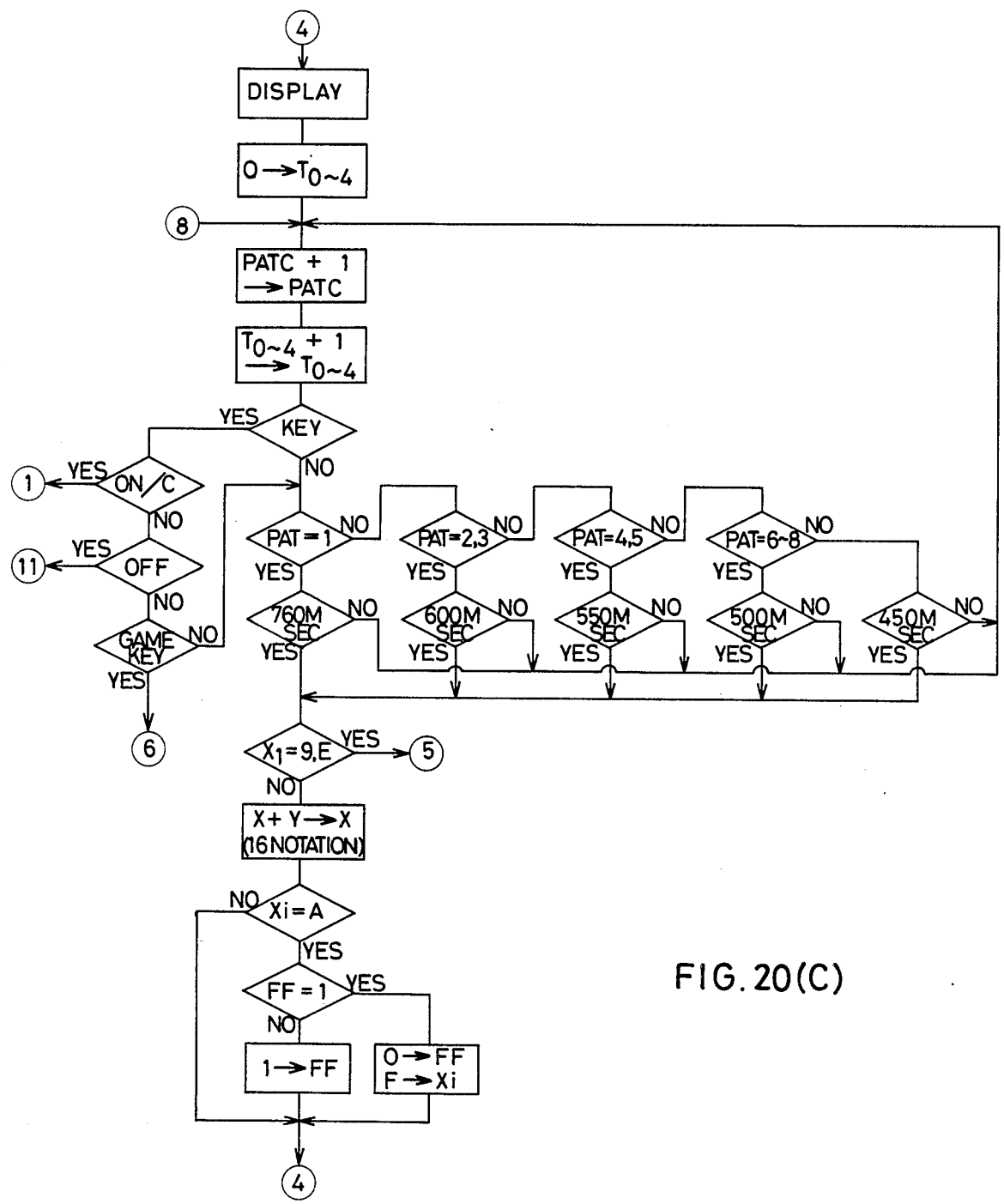

With reference to FIG. 20(C), a display routine is executed. The digit targets are displayed in the LCD 4. The battery indicia is displayed below the uppermost digit. The time counter T and the PATC counter are counted up. Each time a time corresponding to the contents of the PAT register has been elapsed, by detecting that the time counter T counts a predetermined number, the digit targets are counted up.

Once some key switch is actuated during the counting operation, it is determined which key is actuated, so that an appropriate program execution corresponding the type of the actuated key is carried out.

In the flow chart, a flag FF and the game key is referred to the battery shift keys 23 and 24, and the shot key 25. The right battery shift key 23 is actuated, the figure position of the battery indicia is shifted right one figure except in the case where the battery indicia is positioned at the lowermost figure. The left battery shift key 24 is actuated, the figure position of the battery indicia is left shifted left one figure except in the case where the battery indicia is positioned at the uppermost figure.

Figure 20D:
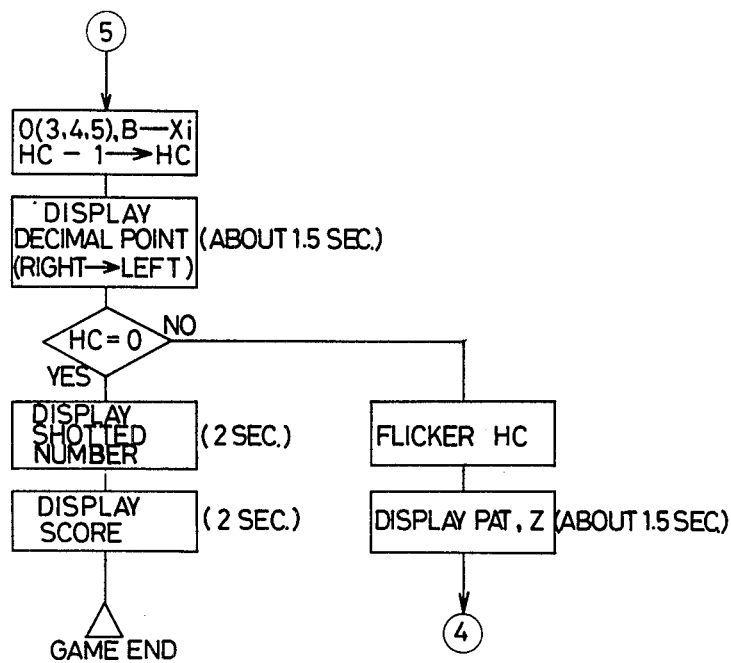

FIG. 20(D) shows a flow chart representative of the case where the mis-shot is executed in the manner as described in the mis-shot 2-(1) is carried out. The mis-shot is referred to the case where the digit targets exceed "9" or "E" before the shot key 25 is actuated even when the battery indicia is positioned at the digit targets. For a next display, a code "0(3,4, or 5)" or "B" is entered into the figure position. The HC counter for storing the remaining number of the remaining battery indicia is counted down. The decimal point is being shifted. It is determined whether the HC counter stores a "0" signal or not.

When HC=0, the game is finished after displaying the current number of the shot targets and the current score. When HC≠0, the displaying for showing the number of the remaining battery indicia corresponding to the contents of the HC counter is flickered. The number of the presently selected difficulty class and the current score are displayed, so that the routine for displaying the digit targets and counting it up is re-executed.

Figure 20E:
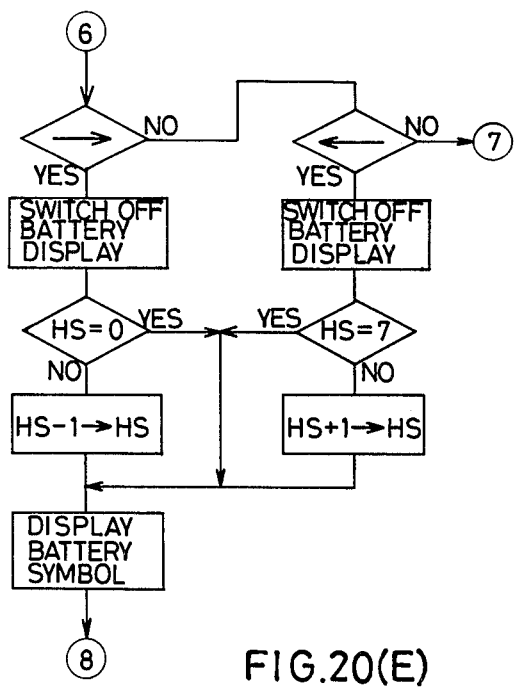

The flow chart of FIG. 20(E) shows a routine in which the contents of the HS register are counted up.

Figure 20F:
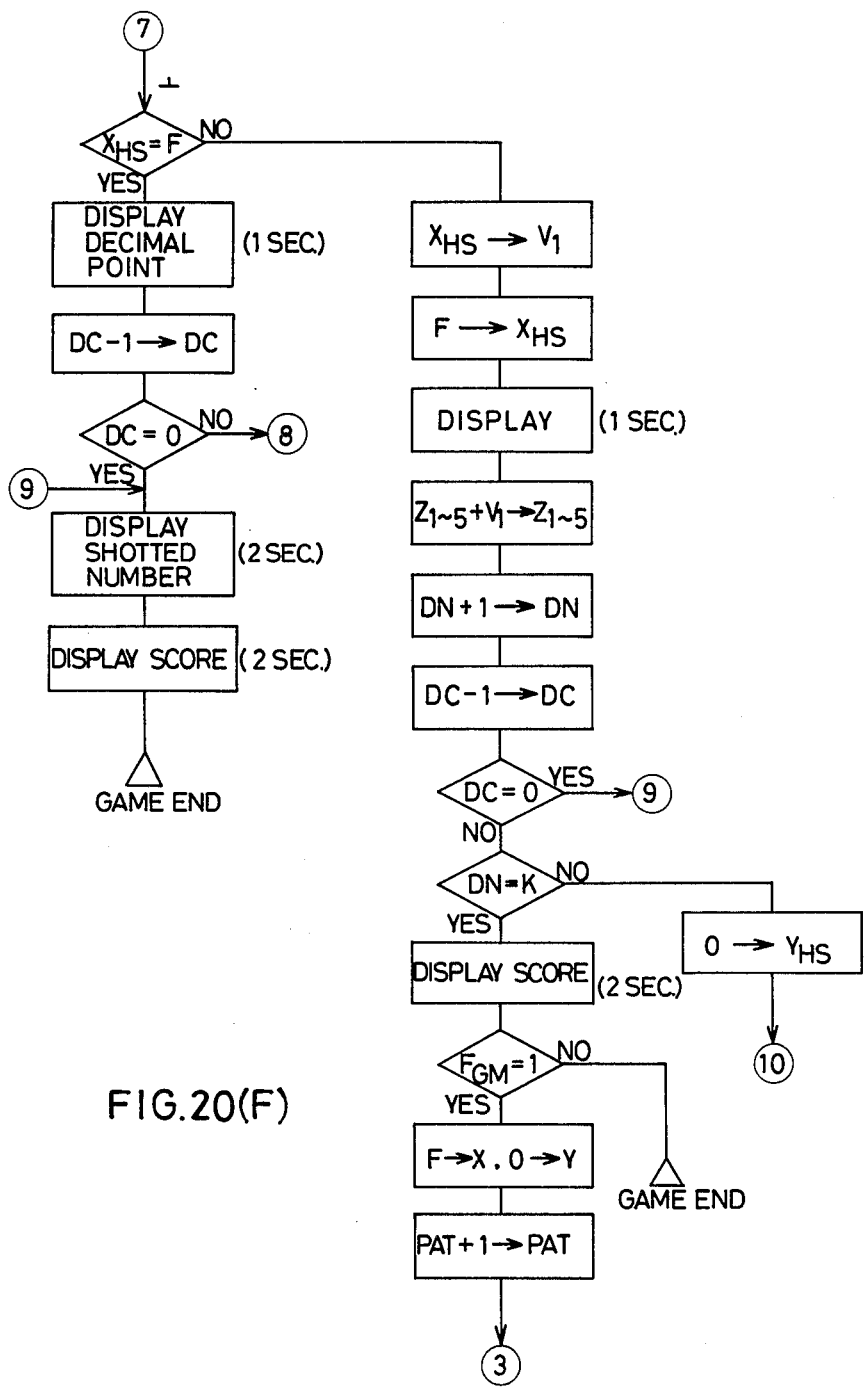

The operation of FIG. 20(F) is selected when the shot key 25 is actuated. It is determined whether the figure positions of the digit targets and the battery indicia are same or not. This detection is held by detecting that the XHS stores someone of the target codes of "0" to "9", and "A"(a bonus point), and "B" to "E", or otherwise, the blank code "F". When they are same, the shot has succeeded. If not, a mis-shot as referred to as 2-(3) has been carried out.

If the mis-shot 2-(3) is carried out, the decimal point is illuminated at this figure position of displaying the battery indicia. The DC counter for counting the number of the remaining battery indicia is counted down. When DC≠0, the above counting operation is repeated. When DC=0, the game is completed after displaying the current number of the digit targets which have been shot and the current score.

If the shot succeeds, there is displayed for about 1 second a display showing that some digit target can be shot and erased at this figure position. A new point is given as a product of the erased digit and 10. The new point is added to the previous score to make a new score. The DN counter for storing the number of the shot-success digit targets is counted up. The DC counter for storing the number of the remaining shots is counted down. When DC=0, the game is ended after displaying the current number of the shot-success digit targets and the current score.

Figure 20G:
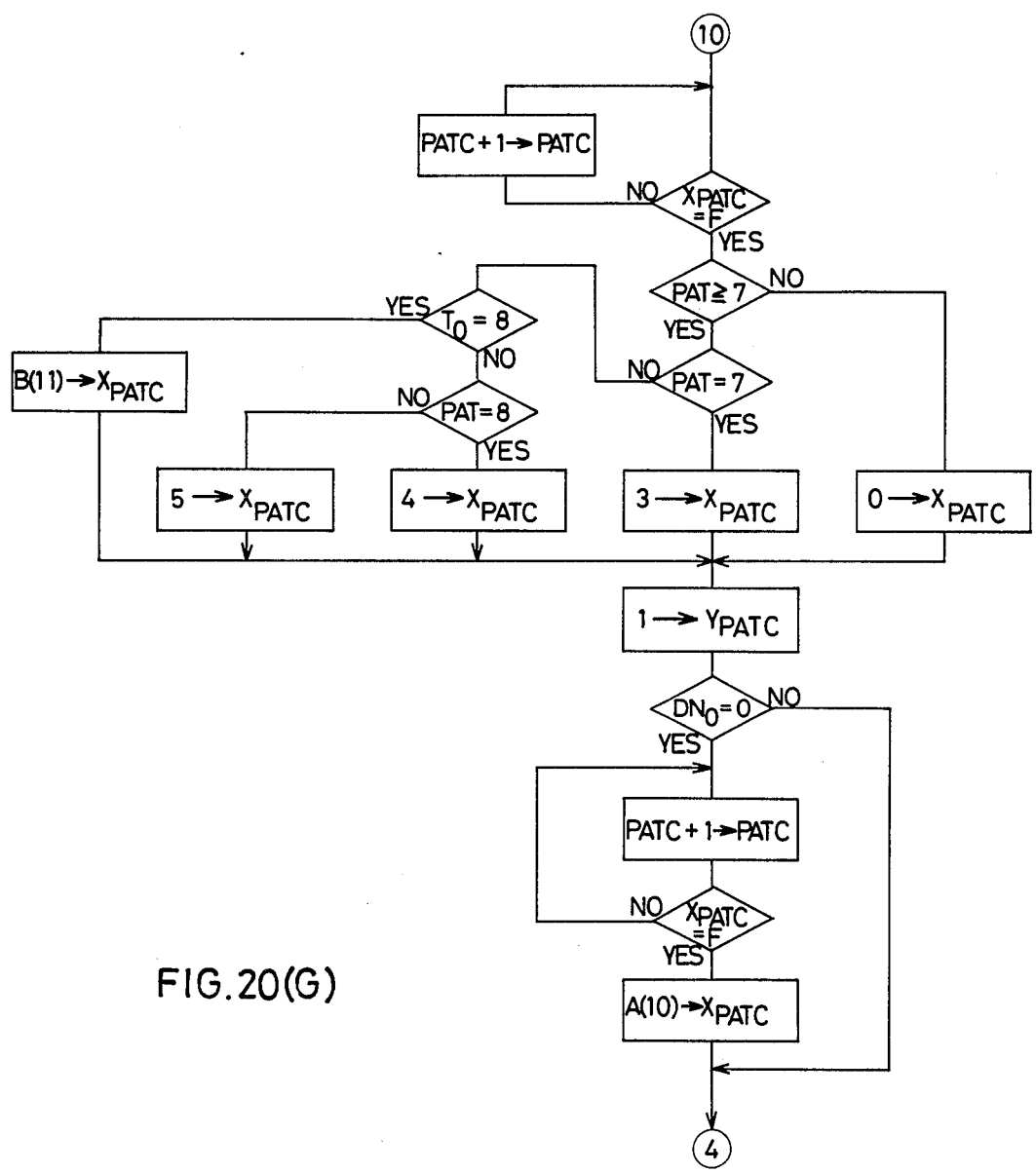

When DC≠0 and the number of the target shots is smaller than the preset number, a "0" signal is entered into the YHS location corresponding to the figure position of the battery indicia, so that the flow chart of FIG.20(G) is selected to display new digit targets.

When the shot number is equal to or more than the present number, the current score is displayed, in which, when the difficulty class has been selected (FGM=0), the game is finished. When the difficulty class is selected (FGM=1), the X and Y registers are cleared and canceled by entering "F" into "X" and, "O" into "Y". Thereafter, a higher difficulty class is now selected, automatically.

FIG. 20(G) shows a routine for displaying new digit targets. In the first stage of this flow chart, when XPATC=F, new target codes are inputted into this figure. When XPATC≠F, "PATC+1" is entered into the PATC counter until XPATC=F. Once it is detected that XPATC=F, new target codes are entered into this figure. Simultaneously, a "1" signal is entered into the YPATC location of the Y register.

In the class 8 and 9 ((PAT=8 and 9), when a "8" signal is stored in the lowermost figure T0 of the timer counter T, the "B" code of (1011) is inputted as the target code into this figure.

It is determined whether the lowermost location DN0 of the DN counter contains the "0" signal or not. When DN≠0, the display routine is selected, so that new targets are displayed.

When DN0=0, the following operation is conducted to display an extra code related to the bonus point in addition to the ordinary codes of the standard digits. For this purpose, a figure for storing the blank code"F" is searched, into which the extra code "A" related to the bonus point is stored.

Thereafter, the display routine is selected. As stated above, FIG. 19 shows the target pattern of the bonus point. As FIG. 20(C) shows, the target for the bonus point is displayed for a very short time. Even when the extra target related to the bonus point is shot, a score-addition similar to the usual case is carried out.

While only certain embodiments of the present invention have been described, it will be apparent to those skilled in the art that various changes and modifications may be made therein without departing from the spirit and scope the present invention as claimed.

What is claimed is:

1. An electronic game apparatus performing a gaming function for use with a device having a diverse primary function comprising:

means for selecting between said primary function in a primary mode and said gaming function in a gaming mode;

display means for displaying a plurality of characters at a plurality of display positions, said display means further displaying one or more target symbols and corresponding game indicia when in said gaming mode;

key input means for introducing information into said device, said key input means further introducing game play information in said gaming mode, said key input means including at least one shift key, a shot key and a class selection key, said class selection key selecting game difficulty in said gaming mode;

target generation means, responsive to selection of said gaming mode, for simultaneously developing a plurality of sequentially varying target symbols at randomly selected ones of said plurality of display positions;

shift means, responsive to actuation of said at least one shift key for shifting a battery game indicia between said display positions;

shot means, responsive to actuation of said shot key, for determining the coincidence between said battery game indicia and any one of said target symbols and upon a coincidence thereof developing a score based on the variation of said one of said target symbols present upon actuation of said shot key;

score means, responsive to said score developed by said shot means, for accumulating a game score by adding each score developed thereby to a total score; and difficulty varying means, responsive to actuation of said class selection key, for varying game difficulty by varying the speed at which said target symbols are sequentially varied by said target generation means;

said target generation means, shift means, shot means, score means and difficulty varying means being collectively comprised by a central processing means (CPU);

said CPU comprising a ROM, a RAM, and an arithmetic and logical unit;

wherein said RAM comprises;

data register means for storing symbol data representative of one or more said target symbols;

data-figure register means for storing position data representative of one or more of the display positions of said target symbols;

score register means for storing said total score;

point register means for storing said score;

game indicia-position register means for storing the display position of the battery game indicia;

timer counter for counting a period of shooting said one or more target symbols with the battery game indicia;

class register means for storing a difficulty class indicative of the selected game difficulty; and count-up register means for incrementing the data representative of the variation in said target symbols.

2. The apparatus of claim 1, wherein said device is an electronic calculator.

3. The apparatus of claim 1, wherein said device is an electronic timepiece.

4. The apparatus of claim 1, wherein each said target symbol is represented at a single display position.

5. The apparatus of claim 1, wherein the battery game indicia acts as a gun battery to "shoot" a said target symbol at a corresponding display position.

6. The apparatus of claim 1, wherein the speed of changing the data of said one or more target symbols is automatically selected by the CPU.

7. The apparatus of claim 1 wherein the number of simultaneously developed target symbols is varied by said difficulty varying means.

8. The apparatus of claim 7 wherein each sequentially varying target symbol has a predetermined number of variations each having a different score associated therewith.

9. The apparatus of claim 8, wherein the predetermined number of variations of each said target symbol is reduced by said difficulty varying means to increase difficulty.

* * * * *